US011980586B2

(12) United States Patent
Tille et al.

(10) Patent No.: US 11,980,586 B2
(45) Date of Patent: May 14, 2024

(54) PACKAGING FOR MEDICINES

(71) Applicant: AARDEX GROUP, Seraing (BE)

(72) Inventors: Nicolas Tille, Seraing (BE); David Dalla Vecchia, Seraing (BE); Bernard Vrijens, Seraing (BE)

(73) Assignee: AARDEX GROUP, Seraing (BE)

( * ) Notice: Subject to any disclaimer, the term of this patent is extended or adjusted under 35 U.S.C. 154(b) by 757 days.

(21) Appl. No.: 17/059,419

(22) PCT Filed: May 29, 2019

(86) PCT No.: PCT/EP2019/064045
§ 371 (c)(1),
(2) Date: Nov. 27, 2020

(87) PCT Pub. No.: WO2019/229165
PCT Pub. Date: Dec. 5, 2019

(65) Prior Publication Data

US 2021/0154096 A1 May 27, 2021

(30) Foreign Application Priority Data

May 30, 2018 (BE) .................................. 2018/5356

(51) Int. Cl.
*A61J 1/03* (2023.01)
*A61J 7/04* (2006.01)

(52) U.S. Cl.
CPC ............. *A61J 1/035* (2013.01); *A61J 7/0418* (2015.05); *A61J 7/0436* (2015.05); *A61J 2200/30* (2013.01)

(58) Field of Classification Search
CPC ........ A61J 1/035; A61J 7/0418; A61J 7/0436; A61J 2200/30
See application file for complete search history.

(56) References Cited

U.S. PATENT DOCUMENTS

| | | | | |
|---|---|---|---|---|
| 9,101,530 | B2 * | 8/2015 | Wilson | A61J 7/02 |
| 9,773,743 | B2 * | 9/2017 | Maijala | H01L 23/645 |
| 10,618,714 | B2 * | 4/2020 | McNannay | A61J 1/065 |
| 2001/0008984 | A1 * | 7/2001 | Omura | G07F 17/0092 700/242 |
| 2002/0139017 | A1 * | 10/2002 | Pines | G09F 1/00 40/124.03 |
| 2009/0194452 | A1 * | 8/2009 | Hession | A61J 7/04 206/532 |
| 2014/0097195 | A1 * | 4/2014 | Anthony | G16H 20/13 221/13 |

FOREIGN PATENT DOCUMENTS

| | | |
|---|---|---|
| DE | 19713915 | 10/1998 |
| WO | 2016137719 | 9/2016 |

OTHER PUBLICATIONS

International Search Report, issued in PCT/EP2019/064045, mailed Dec. 5, 2019.
Written Opinion, issued in PCT/EP2019/064045; mailed Dec. 5, 2019.

* cited by examiner

*Primary Examiner* — Thomas D Alunkal
(74) *Attorney, Agent, or Firm* — Ferguson Case Orr Paterson

(57) ABSTRACT

The invention relates to a packaging (1) for medicines, comprising a base (4) from which two guide rails (6) extend which are arranged to house an electronic monitoring device (9), to a method for manufacturing same, and to the use thereof.

23 Claims, 6 Drawing Sheets

PACKAGING FOR MEDICINES

The present invention relates to a packaging for medicines, and more particularly to a packaging for medicines comprising an electronic monitoring device, to the method for manufacturing same, and also to the use thereof for measuring the compliance of a patient with a prescribed dose.

The compliance of a patient with a dosage regimen is of increasing interest in the current climate. The dosage regimen, also referred to as dosage, of a medicine prescribed to a patient is defined both by the recommended dose and by the frequency of intake. When the medicine is taken, the active substance is metabolized and absorbed by the patient and the plasma concentration thereof increases and then decreases over time. The dosage regimen aims to maintain plasma concentrations within the therapeutic range, that is in the range of concentrations ensuring the optimal therapeutic effect while minimizing the risk of adverse effects. It aims to not drop below the minimum concentration corresponding to an underdose for the patient, which would lead to an increased risk of the therapy failing, and to not exceed a maximum concentration for the patient corresponding to an overdose, which would lead to an increased risk of toxicity. In this context, delayed-release or sustained-release therapies have been developed.

The frequency of intake of the medicine by the patient, and therefore the compliance with the dosage regimen prescribed to them, depends on numerous factors, both intentional and unintentional (forgetting). Moreover, if side effects occur, the reluctance of the patient to take the prescribed dose may result in them delaying the one or the other intake for comfort reasons, in order to suffer the side effects at a more opportune time or in a more opportune location.

Packaging for medicines which contain electronic devices have therefore been developed.

A packaging for medicines comprising an electronic device is therefore known from the prior art, such as those used to measure the exact moment at which the medicine is taken by the patient, which may be compared to the prescribed dosage regimen. This measurement of the variation between the expected behavior of the patient and the measured behavior may be of use to healthcare professionals in order to better monitor their patients. These packagings also sometimes have functionalities making it possible to remind the patient about the medicine intake. For example, it is common practice to use an electronic device pre-programmed according to the dosage prescribed by the doctor on a patient, or to provide them with a "reminder" device; this electronic device emits a warning signal, either audible or light-based or else via a smartphone application in order to inform the patient that they must take their medicine.

However, the device, for example the smartphone, may easily be located elsewhere, for example, in a room, a bag, a suitcase, while the medical treatment is somewhere else. As a result, these "reminder" devices, albeit useful for certain applications, are more often used in the intake of several treatments simultaneously and are intended for patients who forget to take their treatments.

Such a packaging for medicines is particularly used when taking a medicine having irregular intake frequencies, taking several medicines having different intake frequencies, particular medicines for which underdosing or overdosing may have significant consequences for the patient's health, and is intended for patients who forget to take their treatments.

Even in the context of major treatments, academic studies or clinical trials, the patients who take the medicines have significant deviations in terms of the prescribed dosage regimen. Regarding major treatments, such as for example anti-rejection treatments or chemotherapy, it is important to be able to remember the previous intake, since the regularity of the intakes is a key factor in the success of the treatment.

In the case of clinical trials, regularity is also particularly important.

In both cases, whether a major treatment or clinical trials, being able to identify the causal link between the intake of medicines and the success of a treatment or the generation of side effects, or else the lack of efficacy of a treatment, is particularly important since the causal link makes it possible to adapt the patient's dosage in the case of major treatments or the dosage to be prescribed when the medicine under trial is marketed. As a result, measuring the compliance of a patient with a treatment has become an increasing point of interest.

In the context of academic studies or clinical trials relating to medicine development, measuring deviations in the prescribed dosage regimen is the main objective of the electronic device of the packaging for medicines; as for the induced reminder functionality, this is often secondary or even undesired so as not to introduce a bias into the measurement of the efficacy of the medicine on a regular population which is therefore not influenced by a reminder device. Several developments have therefore been made in order to develop electronic devices so that they record the moment, for example the date and the time (or time interval), at which the medicines were taken.

Thus, the data collected by the electronic device corresponding to the moment, such as the time and the date of each intake of medicine, make it possible to more precisely evaluate the efficacy and tolerance of a treatment but also to inform the healthcare professional in the event that a patient does not comply with the prescription made, which might have an effect on the state of their health, for example with a major treatment. In addition, the compliance of the patient with the prescription made may enable the healthcare professional to evaluate if the dosage may be adapted, on a case by case basis.

The information relating to medicine intake, such as the date and time, therefore result either from a voluntary act by the patient linked to their own good will when they notify the intake of the medicine using an electronic monitoring device with mechanical or electronic operation, or from a passively-operated sensor in the electronic device which records an event the opening and closing of a packaging for medicines and which is therefore not linked to a voluntary act by the patient.

There remains a problem with the detection of false-positive events, that is when the passively-operated electronic monitoring device incorrectly records an event associated with the intake of medicine, for example when the packaging for medicines is subject to an impact, falls on the ground or is inadvertently opened, or when the patient incorrectly, for example inadvertently, activates the mechanically-operated electronic monitoring device.

A number of people have attempted to solve this problem associated with false-positive events. For example, document WO2016/137719 is known from the prior art, which discloses a packaging for medicines comprising a container arranged to receive one or more medicine(s), a base arranged to be fixed definitively or temporarily to said container, said base comprising an upper face from which two guide rails extend, each comprising a first part and a second part, said first part of the first rail is parallel to said first part of the second rail, and each extends in a longitudinal direction parallel to the upper surface of the base, an electronic monitoring device for generating data indicative of the intake of said one or more medicine(s) based on event capturing, a sliding card is received in the container and the electronic monitoring device is operatively connected to the packaging in order to generate data indicative of the use of the packaging.

Indeed, in this document of the prior art, the monitoring device is activated and deactivated by a switch, which may be passive or mechanical, when the card comprising the medicines folds or unfolds.

Unfortunately, the electronic monitoring device according to this document is difficult to introduce upon assembly or upon changing the box, which is particularly troublesome for patients suffering from serious illnesses. Moreover, it generates false positives by moving from its position, and the industrial production of the attachment base is difficult.

Document US2009/194452 is also known from the prior art, which seeks to provide a packaging for medicines comprising on the one hand the single-dose cardboard packaging wherein a printed electrical circuit is located and on the other hand a removable electronic device. The problem of false positive events taking place during the accidental opening of the packaging is not addressed by the packaging for medicines in which the electronics is integrated at the level of the single doses.

Unfortunately, the packaging for medicines with a printed electrical circuit according to this document leads to difficult assembly, a considerable ecological impact and complicated recycling of the materials.

While a number of people have attempted to solve the problem associated with false positive events, the fact nonetheless remains that the solutions developed still have disadvantages which limit the widespread use of these smart packagings.

There is therefore a general need to have packagings for medicines for which the electronic monitoring devices are easy to integrate into containers, secure in terms of capturing information regarding medicine intake, and in particular while solving the issue of detecting false positive events. Indeed, packaging for medicines must be produced in large quantities and it is necessary to take into account the constraints of assembly, costs or even recycling of the materials.

The aim of the invention is to solve the abovementioned problems by providing a packaging for medicines as mentioned at the outset, characterized (i) in that each rail is a profiled element provided with a first wall extending perpendicularly to said upper surface of the base, along same, and a second wall extending substantially perpendicularly to said first wall and parallel to said upper surface of the base, (ii) in that said electronic monitoring device comprising two lateral grooves with a shape reciprocal to that of said two rails arranged to be housed in said lateral grooves by sliding, which grooves comprise at least one notch, (iii) in that said second part of said guide rails is curved and comprises at least one lateral protrusion, and (iv) in that said at least one notch of said lateral grooves of said electronic monitoring device and said at least one lateral protrusion of said second part of said guide rails are able to cooperate by forced interlocking.

Indeed, it became advantageously apparent according to the present invention that the fact that each rail is a profiled element provided with a first wall extending perpendicularly to said upper surface of the base, along same, and a second wall extending substantially perpendicularly to said first wall and parallel to said upper surface of the base makes it possible to provide a base on which two rails extend, optionally separate or discrete from one another, of a shape which is easy to manufacture on a large scale by injection molding without the base and the guide rails thereof being deformed upon release from the mold.

According to the present invention, the fact that said electronic monitoring device comprising two lateral grooves with a shape reciprocal to that of said two rails arranged to be housed in said lateral grooves makes it possible to provide an electronic monitoring device which is easy to install in the guide rails by a simple translational movement.

Moreover, according to the present invention, the fact that said second part of said guide rails is curved and comprises at least one lateral protrusion arranged to be housed in said at least one notch of said lateral grooves and thus to interlock therein by force fitting makes it possible to provide an assembly comprising an electronic monitoring device secured in the base thereof, advantageously enables precise and fixed positioning of the electronic monitoring device in the three spatial directions relative to the container on which it is located, while being easy to insert and blocked by a single translational movement while being easy to manufacture.

The terms "precise and fixed positioning of the electronic monitoring device in the three spatial directions" are intended to mean, for the purposes of the present invention, that after the electronic monitoring device has been interlocked in the guide rails of the base, it is blocked and secured in all spatial directions. Indeed, the electronic monitoring device is blocked:

- laterally by the two guide rails,
- upwardly by the second wall of the guide rails extending parallel to the upper surface of the base,
- downwardly by the base,
- toward the front by said second curved part of the guide rails and also by the forced interlocking of said at least one notch and said at least one lateral protrusion,
- toward the rear by the forced interlocking of said at least one notch and said at least one lateral protrusion.

For the purposes of the present invention, the term "curved" means that the second curved part of the guide rails is a section which becomes smaller toward the inside and results in asymmetry which facilitates the identification of the electronic monitoring device in the rails. This curved shape facilitates mold release, facilitates the introduction of the electronic monitoring device which also, due to the complementary shape thereof, has a weaker section at one end which facilitates correct introduction; this narrower section creates guide walls on the electronic monitoring device since the shape must be complementary.

Manufacture without deforming the guide rails, and the simplified positioning of the electronic monitoring device, therefore advantageously makes it possible to have a packaging for medicines which comprises an electronic monitoring device which is easy to integrate in or on a container simply by translation and securing in the guide rails, which improves the quality of the capturing of events associated with the intake of medicines, and reduces the detection of false positive events associated with impacts on the packaging for medicines or with being dropped, by virtue of the precise and fixed positioning in three spatial dimensions by injection molding a base for which the precision of the shaping thereof is improved because mold release does not deform the parts, while simplifying large-scale industrial manufacture.

Additionally, the electronic monitoring device of the packaging for medicines according to the present invention is particularly advantageous for detecting and capturing events associated with opening the packaging for medicines. Which makes it possible to increase the certainty that the event captured is associated with the intake of medicine and not with a false positive event such as accidental opening, an impact or dropping the packaging for medicines according to the present invention. Finally, according to the present invention, the electronic monitoring device is removable and may be re-used on another packaging for medicines once all the medicines of the packaging for medicines have been consumed, or can be placed on a fixed base, for example on a conventional pill dispenser/weekly pill organizer.

In a preferred embodiment according to the present invention, the container may comprise a card received in said container, preferably slidingly received, to give access to the medicines of said card, said base being positioned in a fixed or temporary manner on said card.

Indeed, a card on which medicines are fixed and which also comprises the base which receives the electronic monitoring device makes it possible to increase the certainty that the event captured is associated with the intake of medicine and not with accidental opening of the container. The act of sliding the card out of the container is significantly more indicative of the intake of the medicine than simply opening a container for medicines.

In a variant according to the present invention, said card comprises markers for positioning said base.

Indeed, the positioning markers enable easy assembly of the base comprising the guide rails on the card, in order to ensure optimal positioning of the base.

Advantageously, according to the present invention, said card is formed of two material sections, the first section being arranged to be in contact with a bottom of said container and the second material section is arranged to face the user, said second material section being pierced with a series of orifices, a first orifice of which is provided for housing said guide rails, said base being located between said two material sections forming said card and having, at least in one direction, a width greater than that of said first orifice in order to form a collar which secures said base between said two material sections of said card.

Indeed, when the base is contained between the two material sections forming the card, it is held in its optimal reference position, such that the base is stationary during the insertion or withdrawal of the electronic monitoring device.

In another preferred embodiment according to the present invention, the packaging for medicines further comprises at least one blister pack for medicines being positioned between said two material sections and said medicines being taken out via said series of orifices.

Indeed, the two material sections forming the card, and which comprise a series of orifices via which the medicines of a blister pack are taken out, makes it possible to provide a packaging for medicines which can be adapted to several medicines and treatments.

In a variant according to the present invention, said card can be moved between a first position and a second position such that, in said first position, said card is entirely received in said outer container, and, in said second position, said card is at least partially slid out of said container so as to generate an event arranged to be captured by a sensor of said electronic monitoring device.

Indeed, when the card is entirely received in the container, false positive events are limited when the packaging for medicines is subjected to an impact or is dropped, and the action of sliding the card at least partially out of the container to give a significantly greater indication of the intake of a medicine by an independent patient than simply opening a container for medicines.

Advantageously, according to the present invention, said sensor is a passive mechanical sensor, for example a physical, electronic, electromagnetic, light or chemical push button, preferably a low power consumption sensor.

Indeed, an electronic monitoring device with a sensor according to the present invention may be removed from the packaging for medicines once the medicines have run out, and therefore makes it possible to reuse the electronics on a new packaging for medicines for a period ranging up to three years, but also avoids the battery running down during treatment or if the electronic monitoring device is stored for several months.

In a variant according to the present invention, said at least one lateral groove of said electronic monitoring device comprises at least one stop element arranged to compel the introduction of said electronic monitoring device in a first sliding direction and to prevent the introduction of said electronic monitoring device in a second sliding direction opposite to said first sliding direction.

Indeed, the shape of the electronic monitoring device which is complementary to the shape of the guide rails which have a parallel part and a curved part makes it possible to facilitate the introduction thereof, since the direction of introduction in the first sliding direction is readily identifiable. The presence of at least one stop element enables the electronic monitoring device to not be able to be inserted in a sliding direction which is not the correct sliding direction, and thus makes it possible to facilitate assembly.

In another preferred embodiment according to the present invention, said notch is positioned at a first end of said at least one lateral groove of said electronic monitoring device, and said at least one stop element is positioned at a second end of said at least one lateral groove of said electronic monitoring device opposite to said first end.

In another variant according to the present invention, the electronic monitoring device further comprises a cavity on the upper face, said cavity preferably comprises walls describing a truncated volume.

Advantageously, the cavity is off-center on said upper face.

In another preferred embodiment according to the present invention, the card has a first part which can be folded down onto a second part, which comprises said series of orifices, said first part further comprising a magnet, preferably of asymmetrical shape, preferentially having a different length and width, intended to be housed in said cavity of said electronic monitoring device, said magnet and said cavity being of complementary shape.

Indeed, a magnet is particularly suited to interacting with and actuating the electronic monitoring device; having an asymmetrical shape, the magnet is fixed in the conventional meaning for the operation thereof and the interaction thereof with the electronic monitoring device.

Moreover, by having a magnet and a cavity of the electronic monitoring device with complementary shapes, contact between the two is precise; the magnet is thus perfectly housed in the cavity when the card is in the folded form and inserted in the container such that there is no obstacle to the insertion of the card which slides into the container, nor any deformation. When the card is withdrawn from the container and opened in order to access the medicines, the magnetic coupling between the magnet and the electronic monitoring device is broken, leading to the capture of an event associated with opening the card and taking the medicine.

Additionally, the complementary shapes make it possible to maintain, in the closed state, strong cohesion of the packaging for medicines such that, during an impact on the packaging for medicines or when the latter is dropped, the magnet cannot leave the cavity of the electronic monitoring device, considerably reducing false positive events.

Advantageously, according to the present invention, the electronic monitoring device further comprises a power source, a processor and optionally a display device, preferably an LCD screen, said processor being arranged to process the captured events and transmit a signal comprising said data indicative of the intake of said one or more medicine(s), said indicative data being optionally displayed on said display device.

Indeed, by having a processor, the events and data indicative of the intake of medicine can be exported by transmitting a signal, and, by having a display device, the electronic monitoring device is particularly suited to notifying the patient that the medicine has indeed been taken.

In another preferred embodiment according to the present invention, the electronic monitoring device comprises a memory arranged to record the date and time of said captured event.

Advantageously, according to the present invention, the container may be a medicine package, a pill dispenser, a weekly pill organizer.

Advantageously, according to the present invention, the packaging for medicines further comprises a system for blocking the opening of said container, arranged to prevent opening by a child.

Other embodiments of the packaging for medicines are given in the appended claims.

The present invention also relates to a method for manufacturing a packaging for medicines.

The methods for manufacturing packaging for medicines comprising an electronic monitoring device do not make it possible to have a packaging for medicines in which the electronic monitoring device is easy to integrate into a container, which is secure in terms of capturing information relating to the intake of medicines, solving the issue of detecting false positive events such as impacts on the packaging for medicines or else being dropped.

Indeed, as indicated previously, the packaging for medicines must be secure in terms of capturing information relating to the intake of medicine, solving the issue of detecting false positives, while being manufactured on a large scale with easy assembly.

In order to solve these problems, the invention provides a method for manufacturing packaging for medicines comprising the steps of:

- providing a container arranged to receive one or more medicine(s),
- placing a base on said container, said base comprising a lower face arranged to be in contact with said container and an upper face from which two guide rails extend, which are arranged to house an electronic monitoring device between said two guide rails, said electronic monitoring device being arranged to generate data indicative of the intake of said one or more medicine(s) based on event capturing.

Indeed, the method of manufacturing a packaging for medicines enables a very simple assembly on the container which may be of any type, such as a conventional pill dispenser, or a packaging described in XXX which is arranged to receive an electronic monitoring device and thus make it possible to provide a high degree of security in terms of capturing information relating to the intake of medicines, and which, due to the robustness of the housing thereof, reduces the detection of false positive events.

Moreover, the method of manufacturing the packaging for medicines according to the present invention makes it possible to provide a packaging for medicines the electronic monitoring device thereof is recyclable once the medicines have been consumed, to be moved on a new packaging for medicines, while being easy to install by a simple translational movement and being secure in the capture of information.

Advantageously, according to the present invention the container is formed from a container side by folding thereof.

Indeed, a container side can be produced simply and industrially on a large scale and the formation thereof by folding is also readily achievable.

In another preferred embodiment according to the present invention, the method further comprises providing a card side comprising a first section and a second section pierced with a series of orifices, a first orifice of which is provided for housing said guide rails, said method comprising folding down said second section onto said first section, each section being positioned on either side of said base, the guide rails protruding through said first orifice and simultaneously placing a blister pack provided with a series of medicines housed in film-covered cavities of said blister pack, each medicine of said series of medicines of said blister pack being arranged facing an orifice of said series of orifices of the card side in order to form a substantially planar card with said first section and said second section positioned on either side of said blister pack and of said base.

Indeed, the card on which medicines are fixed is particularly suited to use in a container and to the fixing of the base comprising the guide rails for the subsequent insertion of the electronic monitoring device.

Moreover, the card formed of a second section pierced with a series of orifices, folded down onto a first section, particularly advantageously makes it possible to place, between the two material sections, the elements to be positioned, such as the base which comprises the guide rails or a blister pack of medicines. In this way, the elements are stationary between the two material layers and protrude through orifices in order to form a substantially planar card.

In another variant according to the present invention, the first section and the second section comprise three parts juxtaposed lengthwise, a bottom part, a back part and a top part, each separated from one another by a fold line; said bottom part of said second section comprising said series of orifices, said method further comprising a step of folding along said fold lines, and a step of folding down said top part of said first and of said second section above said bottom part of said first and of said second section.

Indeed, the three parts juxtaposed lengthwise enable the card to be folded down on itself along the fold lines and for example to be able to have two medicine blister packs, the first on the bottom part and the second on the top part. During the folding down, the medicines of the blister pack of the top part will become inserted in the spaces between medicines of the blister pack of the bottom part, which enables the card, once folded, to be suited to insertion into the container without deformation.

Advantageously, according to the present invention, the base is positioned on markers of said bottom part of said first section of said card side; indeed, the positioning markers enable precise fixing of the base on the card side.

In a variant according to the present invention, the method further comprises a step of placing a magnet on said top part of said second section of the card side, said magnet being arranged to be housed in a cavity of said electronic monitoring device when it is inserted between said guide rails and thus generate an event upon each contacting and/or separation between said magnet and said cavity; preferably on markers for positioning the magnet on said top part of said second section of said card side.

Other embodiments of the method for manufacturing a packaging for medicines according to the present invention are given in the appended claims.

The present invention also relates to a use of a packaging for medicines.

The invention provides the use of a packaging for medicines for measuring the compliance of a patient with a prescribed dose.

Indeed, it became apparent that having the packaging for medicines according to the present invention is advantageous for studying the compliance of a patient with a prescribed dose.

Other use forms of the packaging for medicines are given in the appended claims.

The invention will now be described in greater detail with reference to the appended figures.

FIGS. 1*a-b* show, respectively, a top view and a rear view of the base provided with two guide rails of the packaging according to the present invention.

FIGS. 2*a-c* show, respectively, a top view, a rear view and a side view of the electronic monitoring device of the packaging according to the present invention.

Figure 6:
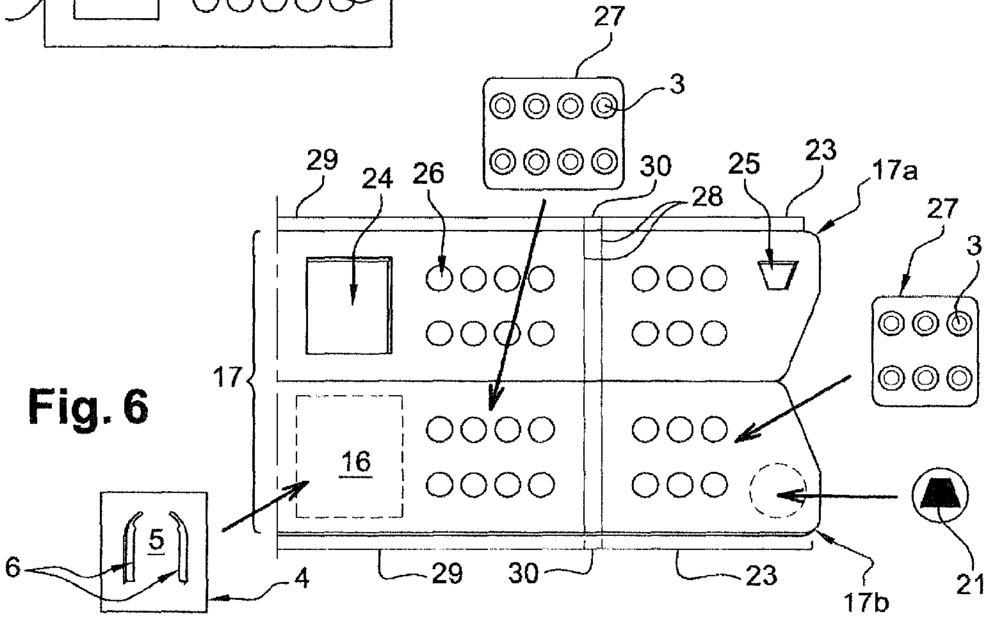
FIG. 6 is an exploded top view of the card side showing the positioning of the base, of two blister packs of medicines and of the magnet, the markers for the respective positioning thereof as well as the different corresponding orifices on the card of the packaging according to the present invention.
Figure 7:
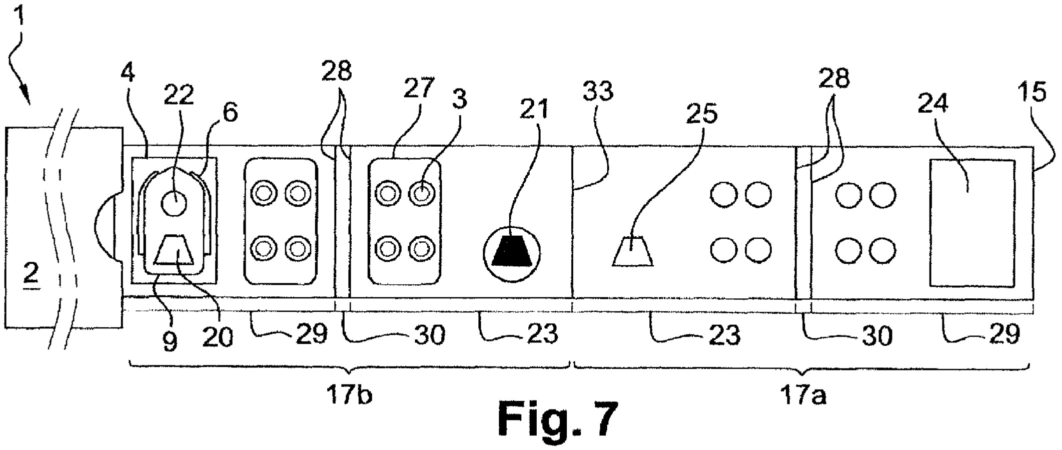
FIG. 7 is a top view of the card side showing the base and the electronic monitoring device in the assembled state, two blister packs of medicines and the magnet as well as the different corresponding orifices on the card of the packaging according to the present invention.
Figure 8A:
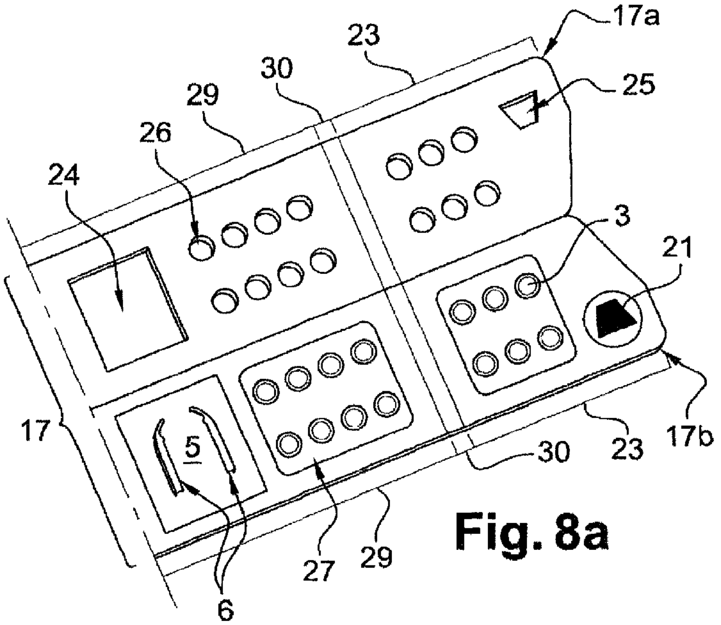

FIG. 8*a* is a top view of the card side from FIG. 6, on which the base, the two blister packs and the magnet are in the assembled state according to an alternative folding of FIG. 7 according to the present invention.

Figure 8B:
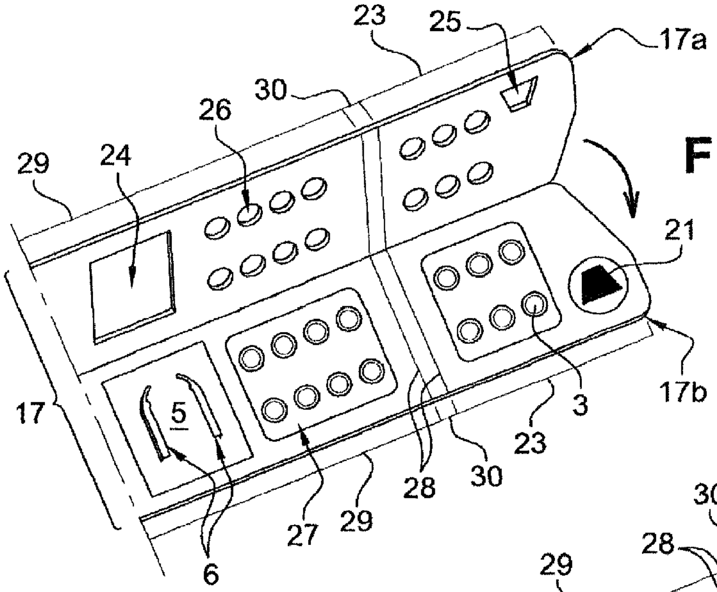

FIG. 8*b* is a perspective view of FIG. 8*a* illustrating the folding down of the first section onto the second section of the card side of the method according to an alternative folding of FIG. 7 according to the present invention.

Figure 8C:
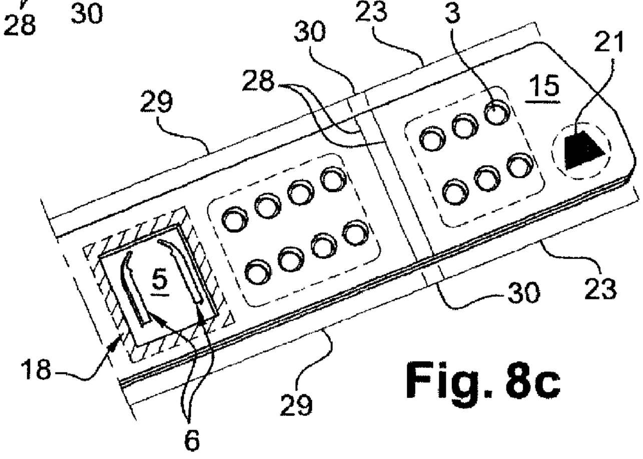

FIG. 8*c* is a top view of the card in the assembled state showing the base, the medicines and the magnet of the packaging according to an alternative folding of FIG. 7 according to the present invention.

FIGS. 9*a-e* are top views of the packaging for medicines according to the present invention, showing the container, the card comprising the medicines, the base and the electronic monitoring device, the three steps (a-c) of assembling the electronic device on the card according to the present invention and the two steps (d-e) of folding the card and sliding it into the container of the packaging for medicines.

Figure 5:
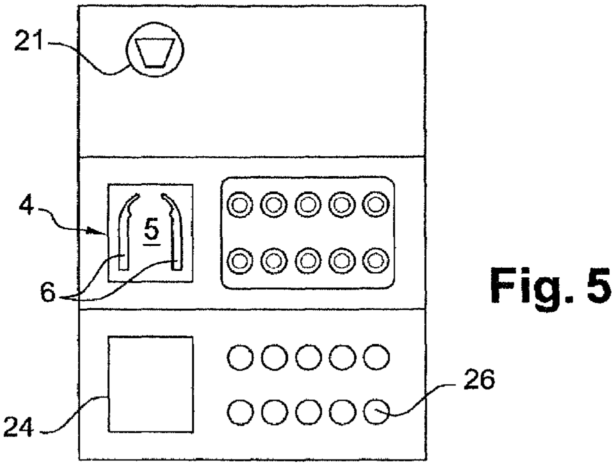
FIG. 5 is an exploded top view of the card side showing the positioning of the base and of a blister pack of medicines, the positioning markers thereof as well as the magnet according to the present invention.
Figure 10:
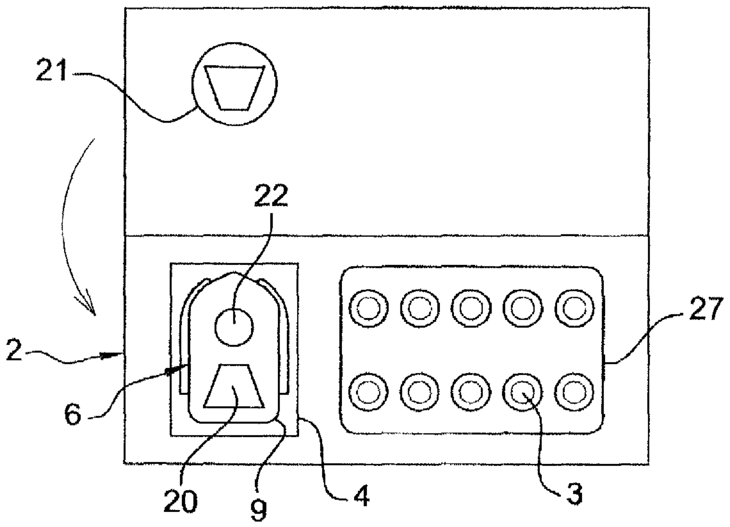

FIG. 10 is a view of the embodiment of FIG. 5 in the assembled state showing the base and the electronic monitoring device, a blister pack for medicines, the magnet according to the present invention.

Identical or analogous elements have the same references in the figures.

Figure 1A:
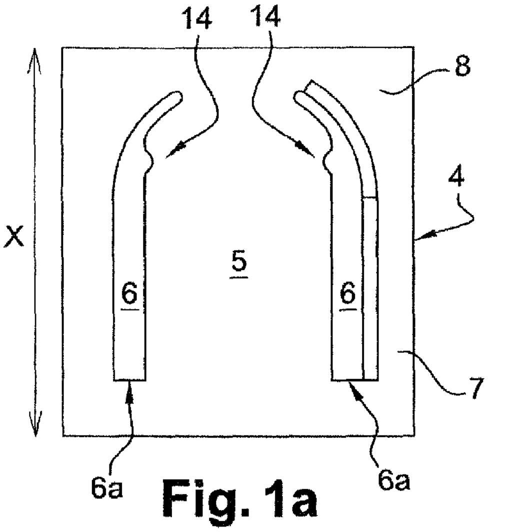
Figure 1B:
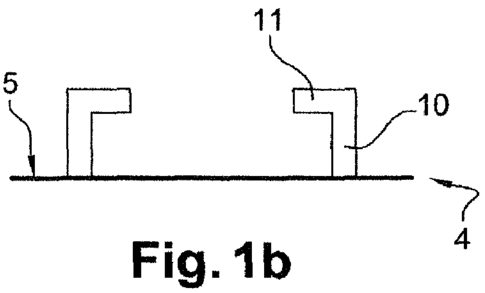

FIGS. 1*a* and 1*b* illustrate a base 4 comprising an upper face 5 from which two guide rails 6 extend, each of the guide rails 6, separate or discrete from one another, comprises a first part 7 and a second part 8, and the first parts 7 of each of the two guide rails 6 are parallel to one another and extend in a longitudinal direction X parallel to the upper surface 5 of the base 4.

According to the present invention, each guide rail 6 is a profiled element provided with a first wall 10 which extends perpendicularly and along the upper surface 5 of the base 4 and each guide rail 6 is provided with a second wall 11 which extends perpendicularly to the first wall 10 and parallel to the surface 5 of the base 4. Finally, the second part 8 of the two guide rails 6 is curved and each comprises a lateral protrusion 14. In this way, the section between the guide rails 9 is smaller in a direction of introduction.

Figure 2A:
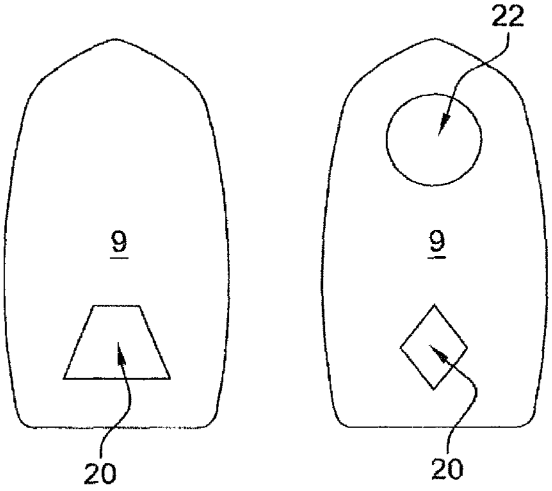
Figure 2B:
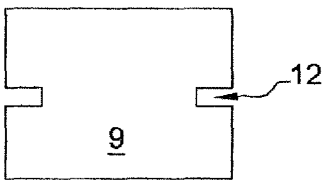
Figure 2C:
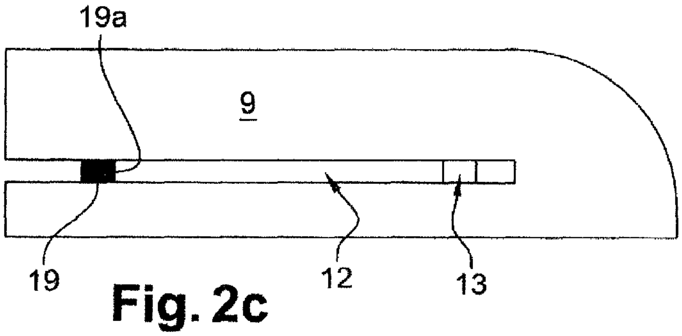

FIGS. 2*a*, 2*b* and 2*c* illustrate an electronic monitoring device 9 which makes it possible to generate data indicative of the intake of the medicine based on event capturing.

According to the present invention, the electronic monitoring device 9 further comprises two lateral grooves 12 with a shape reciprocal to that of the guide rails 6 extending on the upper face 5 of the base 4. The guide rails 6 are arranged to be housed in the lateral grooves 12 of the electronic monitoring device 9. Finally, the lateral grooves 12 of the electronic monitoring device 9 comprise at least one notch 13 which is able to cooperate by forced interlocking with the lateral protrusion 14 of each guide rail 6 when the electronic monitoring device 9 is inserted into the guide rails 6 of the base 4. The section of the electronic monitoring device 9 is also smaller on one side compared to the section on the opposite side, which gives an asymmetrical shape to the electronic monitoring device 9.

According to the present invention, the lateral grooves 12 of the electronic monitoring device 9 comprise at least one stop element 19 which serves to prevent the electronic monitoring device 9 from being introduced upside down into the guide rails 6 of the base 4 by blocking; indeed, in the case of upside-down positioning during the insertion of the electronic monitoring device 9 into the guide rails 6 of the base 4, the electronic monitoring device 9 is blocked and cannot be inserted because, when it is inserted, the end 6*a* of each guide rail 6 abuts against the stop 19*a*, since the electronic monitoring device 9 has a greater length than the length of each guide rail 6. Finally, the notch 13 is located at a first end in the lateral grooves 12 in the direction of insertion I of the guide rails 6 while the stop element 19 is located at a second end in the lateral grooves 12 opposite to the first end. In this way, the notch 13 is located at the front of the electronic monitoring device 9 in the direction of insertion I thereof into the guide rails 6, while the stop element 19 is located at the back of the electronic monitoring device 9 in the direction of insertion I thereof into the guide rails 6 of the base 4.

In a preferred embodiment of the present invention, the electronic monitoring device 9 further comprises a cavity 20 on the upper face thereof, as opposed to the lower face which is in contact with the upper surface 5 of the base 4 during the insertion of the electronic monitoring device 9 into the guide rails 6. This cavity 20 preferably comprises rounded walls and is off-center on the upper face of the electronic monitoring device 9.

In a preferential embodiment of the present invention, the electronic monitoring device 9 further comprises a display device 22 on the upper face thereof, as opposed to the lower face which is in contact with the upper surface 5 of the base 4 during the insertion of the electronic monitoring device 9 into the guide rails 6; preferably, the electronic monitoring device 9 is an LCD screen which is particularly useful for communicating visual information.

In a preferred embodiment, the electronic monitoring device 9 comprises a power source, for example a cell or battery, a processor arranged to record an event associated with the intake of medicine. This processor records the event then stores this information in a memory of the electronic monitoring device and may transmit the data corresponding to this information to an external reader which may be remote, for example a reader using NFC technology.

Figure 3:
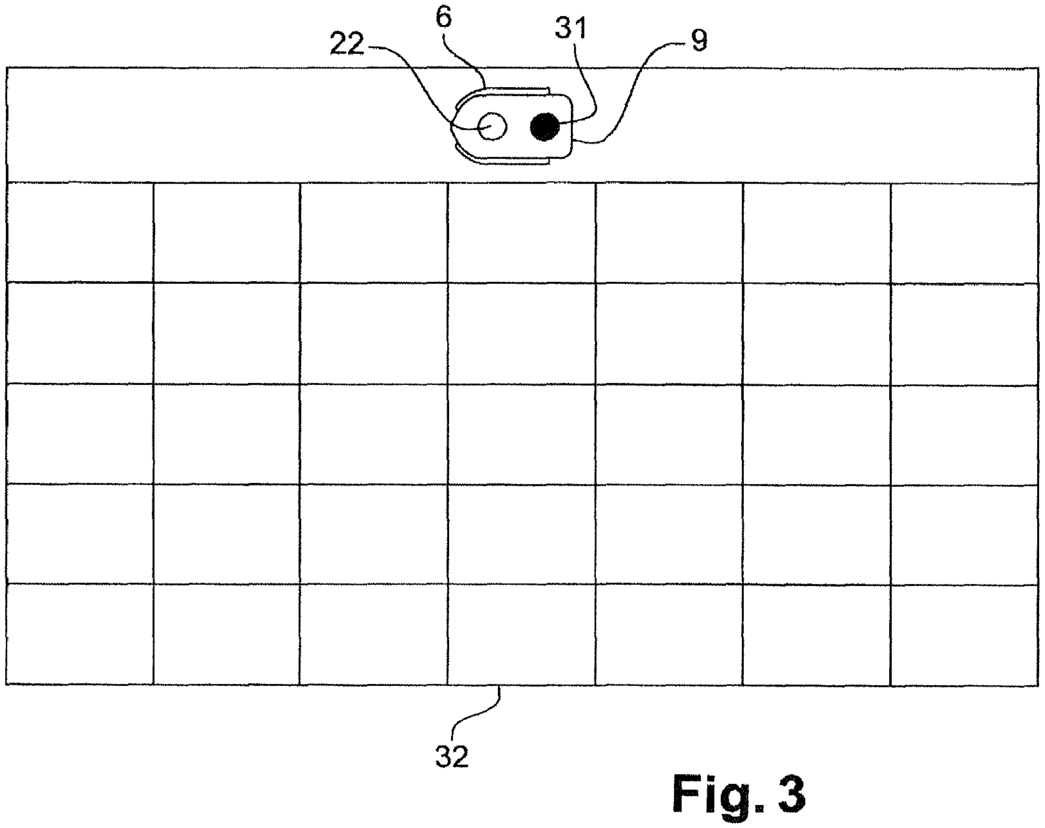
FIG. 3 shows a top view of a weekly pill organizer for medicines showing the base, the two guide rails and the electronic monitoring device according to the present invention.

FIG. 3 shows a weekly pill organizer 32 for medicines according to the present invention. Indeed, a weekly pill organizer 32 is particularly suited for a weekly or monthly treatment in which the patient will arrange their medicine in the corresponding locations.

The base 4 comprising the two guide rails 6 is fixed to the weekly pill organizer using an attachment system, for example an adhesive, a glue, a Velcro® system. The electronic monitoring device 9 is inserted according to the present invention between the guide rails 6 of the base 4, it comprises a display device 22 on the upper face thereof and additionally a push button 31 arranged to actuate the electronic monitoring device 9 by pressing.

Figure 4:
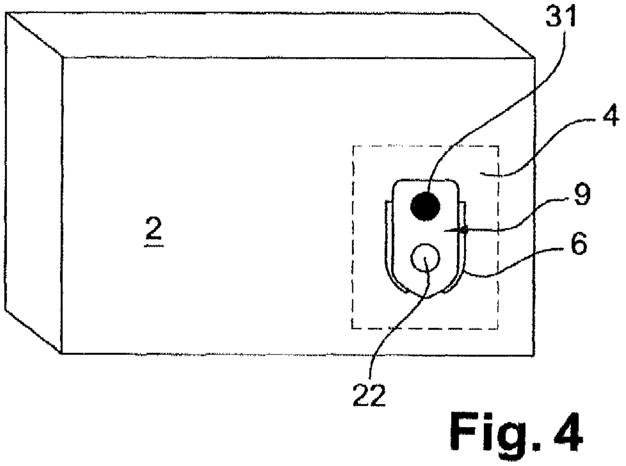
FIG. 4 shows a perspective view of a medicine package showing the base, the two guide rails and the electronic monitoring device according to the present invention.

FIG. 4 shows a medicine package comprising a container 2 on which the base 4 comprising the two guide rails 6 is fixed using an attachment system, for example an adhesive, a glue, a Velcro® system. The electronic monitoring device 9 is inserted according to the present invention and comprises, on the upper face thereof, a display device 22 and additionally a push button 31 arranged to actuate the electronic monitoring device 9 by pressing.

FIG. 5 shows three material layers, the first material layer comprising the magnet 21, the second material layer comprising the base 4, the two guide rails 6 on the upper surface 5 and a blister pack of medicines, and the third material layer comprising the orifices 24, 26, corresponding respectively to the base 4 and to the blister pack of medicines.

FIG. 6 shows a preferred embodiment of the present invention comprising two material sections 17*a* and 17*b*, the base 4 comprising the guide rails 6, two blister packs 27 of medicines 3 and a magnet 21 as well as the respective positioning markers 16 thereof, and the corresponding orifices 24, 25, 26.

In this preferential embodiment of the present invention, the card 15 comprises two material sections 17*a* and 17*b* which folding onto one another to form the card 15. These material sections 17*a*, 17*b* each comprise three discrete parts, namely a bottom part 29, a back part 30 and a top part 23.

The material section 17*b* comprises, on the bottom wall 29, the positioning marker 16 of the base 4 comprising the guide rails 6 and the positioning marker of a first blister pack 27 of medicines 3, on the top wall 23, a positioning marker of the magnet 21 and a positioning marker of a second blister pack 27 of medicines 3.

The material section 17*a* comprises, on the bottom wall 29, an orifice 24 provided for housing the guide rails 6 of the base 4, a series of orifices 26 provided for housing the medicines 3 of the first blister pack 27, on the top wall 23, an orifice 25 provided for housing the magnet 21 and orifices corresponding to the medicines 3 of the second blister pack 27. The orifices 24, 25, 26 enable the different elements, such as the guide rails 6, the medicines 3 and the magnet 21, to be accessible at the surface once the card 15 is in the assembled state.

Additionally, the two material sections 17*a*, 17*b* comprises two fold lines 28 which make it possible, once the two material sections 17*a*, 17*b* have been superimposed on one another to form the card 15, to fold the top part 23 of the card 15 onto the bottom part 29 of the card 15 for insertion into a container 2.

In a preferred embodiment, the magnet 21 is asymmetrical, for example it may comprise a different length and width so as to facilitate the placing of the magnet 21 on the card 15 in its correct operational position. Finally, the magnet 21 is placed on a part 23, which is intended to be folded, of the card 15.

FIG. 7 shows an embodiment of the packaging for medicines 1 according to the present invention, comprising a container 2, two material sections 17*a*, 17*b*, each of which comprises three discrete parts, a bottom part 29, a back part 30 and a top part 23.

In this embodiment of the present invention, the bottom wall 29 of the material section 17*b* comprises on the one hand the base 4 comprising the guide rails 6 into which the electronic monitoring device 9 is inserted and on the other hand a first blister pack 27 of medicines 3. As for the top wall 23 of the material section 17*b*, it comprises a second blister pack 27 of medicines 3 and a magnet 21.

The electronic monitoring device 9 comprises a cavity 20 for housing the magnet 21 and additionally a display device 22, preferably an LCD screen.

Additionally, the bottom wall 29 of the material section 17*a* comprises an orifice 24 provided for housing the guide rails 6 of the base 4 and a series of orifices for housing the medicines 3 of the first blister pack 27. The top wall 23 of the material section 17*b* comprises an orifice 25 provided for housing the magnet 21 and a series of orifices for housing the medicines 3 of the second blister pack 27.

Indeed, in order to assemble the card 15 in the assembled state, the material section 17*a* folds onto the material section 17*b* along the fold line 33. The base 4 comprising the guide rails 6, the blister packs 27 comprising the medicines 3 and the magnet 21 will be accessible through the respective orifices 24, 26 and 25.

In this embodiment of the present invention, the top part 23 of the card 15 in the assembled state folds onto the bottom part 29 of the card in the assembled state along the fold lines 28. Indeed, the magnet 21, during folding, is housed in the cavity 20 of the electronic monitoring device 9 so as to establish contact. Additionally, the card 15 in the folded state is slidingly received in the container 2.

When the card 15 is removed from the container 2, the top part 23 is unfolded along the fold lines 28, the contact between the magnet 21 housed in the cavity 20 of the electronic monitoring device 9 is broken, which makes it possible to generate data indicative of the intake of the medicine 3 based on event capturing.

FIG. 8*a* shows the card 15 side according to the embodiment of FIG. 6, comprising the two material sections 17*a*, 17*b* on which the base 4, the two blister packs 27 and the magnet 21 are in the assembled state according to the present invention.

FIG. 8*b* shows the folding of the material section 17*a* onto the material section 17*b* according to the embodiment of FIG. 8*a*.

FIG. 8*c* shows the card 15 in the assembled state which shows on the one hand the bottom part 29 on which the guide rails 6 and the medicines 3 of the blister pack 27 are accessible at the surface through the orifices 24, 26, on the other hand the top part 23 on which the medicines 3 of the blister pack 27 and the magnet 21 are accessible at the surface through the orifices 26, 25. Finally, the back part 30 makes it possible to fold the top part 23 onto the bottom part 29 along the fold lines 28 in order to house the magnet 21 in the cavity 20 of the electronic monitoring device 9 and to slidingly insert the card 15 into a container 2 according to the present invention.

Additionally, the guide rails 6 of the base 4 are accessible for the assembly of the electronic monitoring device 9. In this preferred embodiment of the present invention, the collar 18 of the base 4 has a length and a width than the corresponding orifice 24, which makes it possible to make the guide rails 6 accessible at the surface and to hold the base 4 between the two material sections 17*a*, 17*b* in order to prevent it being torn out.

FIGS. 9*a-e* show a preferred embodiment of the packaging for medicines 1 according to the present invention; indeed, the packaging for medicines 1 comprises a container 2, a card 15 which is preferably slidingly received in the container 2. The card 15 comprises, on the top wall 23, the medicines 3 and the magnet 21, on the bottom wall, the medicines 3 and the guide rail 6 of the base 4.

Figure 9A:
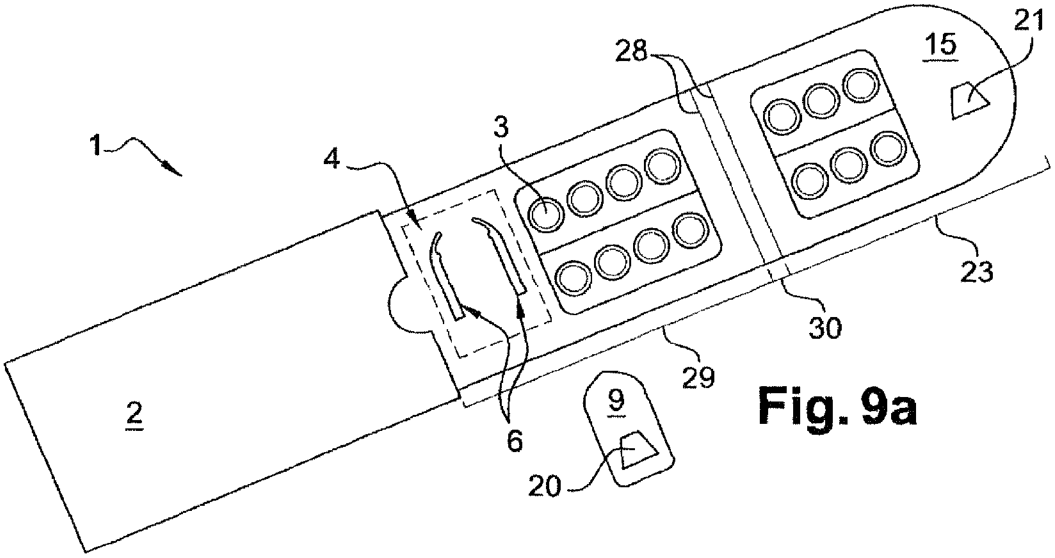

FIG. 9*a* shows the packaging 1 for medicines according to the present invention, wherein the electronic monitoring device 9 separated from the guide rails 6 of the base 4 located on the card 15.

Figure 9B:
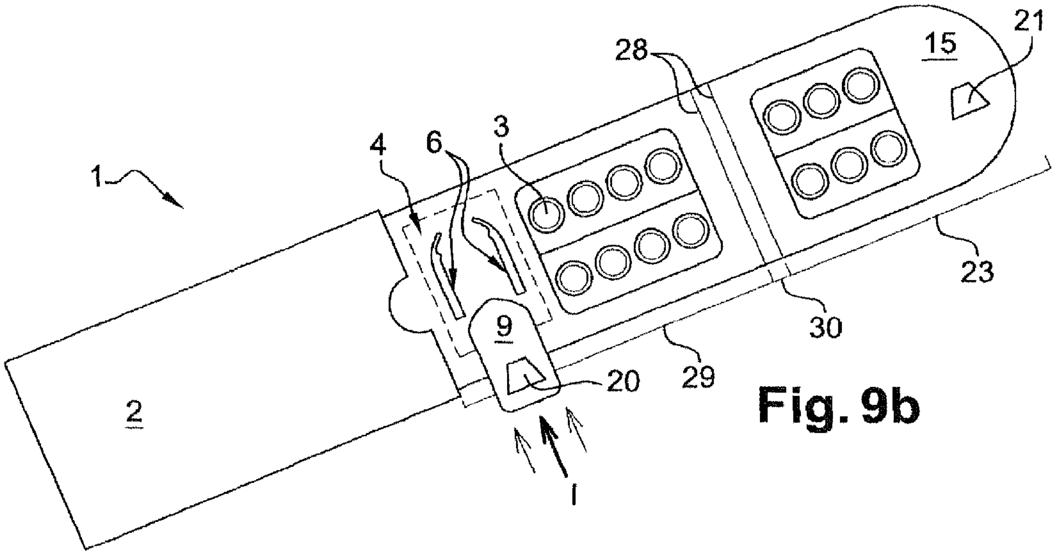

FIG. 9*b* shows the insertion of the electronic monitoring device 9 into the guide rails 6 of the base 4 located on the card 15 by a translational movement I until the forced interlocking of the lateral protrusions 14 of the guide rails 6 in the notches 13 of the lateral grooves 12 of the electronic monitoring device 9.

Figure 9C:
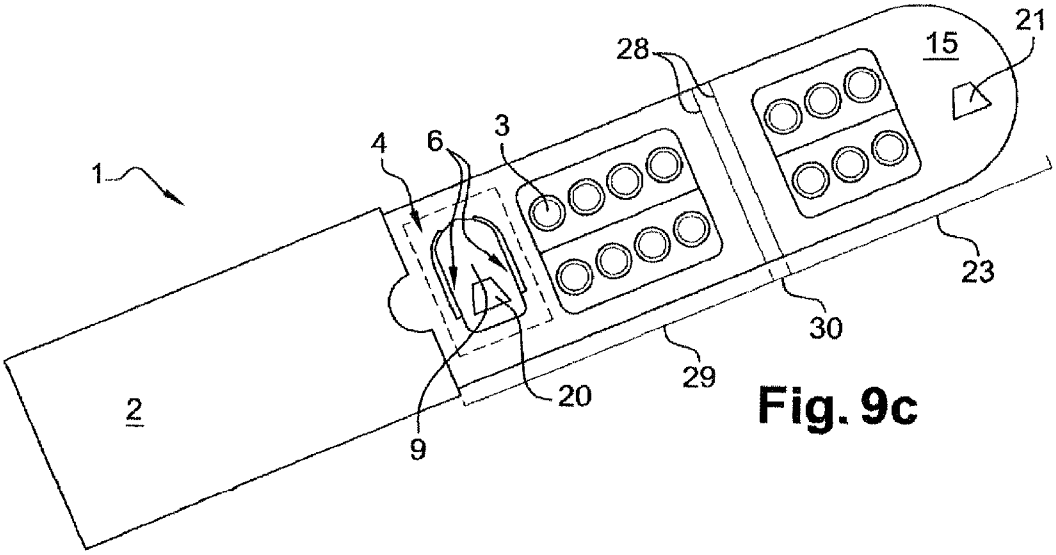

FIG. 9*c* shows the packaging for medicines 1 according to the present invention in the assembled state wherein the electronic monitoring device 9 is positioned in the guide rails 6 of the base 4 such that, by being blocked, the electronic monitoring device 9 is stationary in the three spatial directions in order for it to not be able to be moved in the event of an impact or dropping of the packaging for medicines 1, thus reducing the detection of false positive events.

In a preferred embodiment of the packaging for medicines 1 of the present invention, the electronic monitoring device 9 comprises a passive or mechanical sensor, preferably a low power consumption sensor. Preferentially, the sensor of the electronic monitoring device 9 may be a mechanical sensor, such as, for example, a physical, electronic, electromagnetic, light or chemical push button, such that the electronic monitoring device 9 is activated via its sensor by an external element.

In a preferred embodiment of the packaging for medicines 1 of the present invention, the electronic monitoring device 9 comprises a cavity 20 of complementary shape to the magnet 21 placed on the card 15.

The electronic monitoring device 9 is configured to record the date and time of the opening of the packaging for medicines 1, which corresponds to a voluntary opening movement by the patient for taking a medicine. The electronic monitoring device 9 is preferably configured to transmit the information about the intake of the medicine via the opening of the packaging for medicines 1 to an external reader by different known methods, such as NFC, Bluetooth, WiFi, infrared technologies.

Figure 9D:
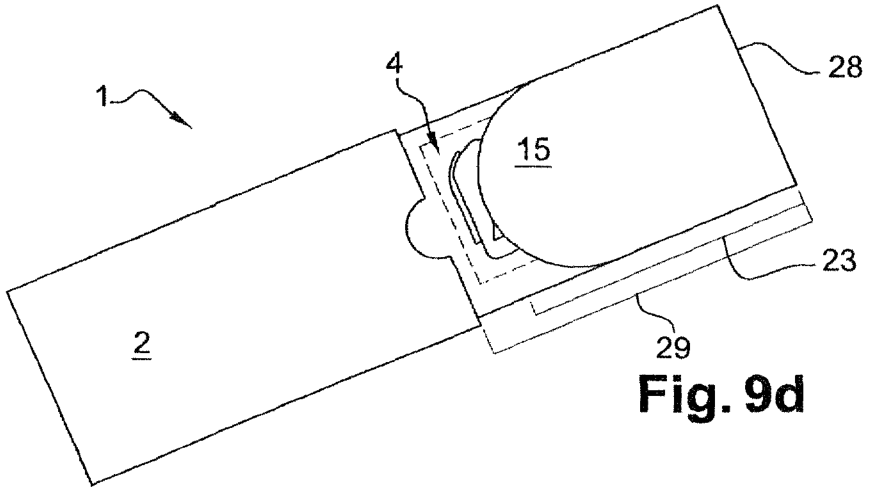
Figure 9E:
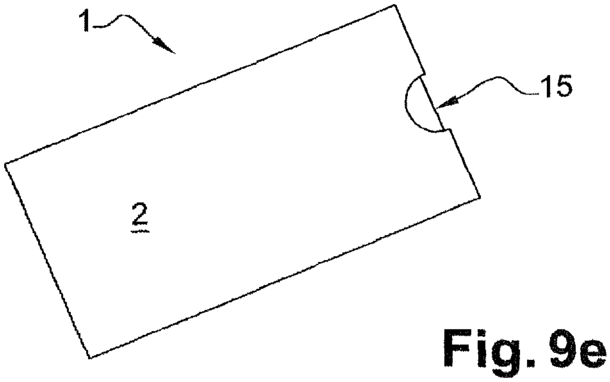

FIG. 9*d* shows the packaging for medicines 1 according to the present invention when the card 15 is in the folded state, that is when the top part 23 is folded onto the top part 29 along the fold lines 28 of the back part 30. In this configuration, the magnet 21 is placed in the cavity 20 of complementary shape of the electronic monitoring device 9; the walls of the cavity 20 are preferably rounded to facilitate the insertion of the magnet 21 therein, the medicines 3 of the top part 23 are located in the recess between two medicines 3 of the bottom part 29. When the card 15 is in the folded position, an electromagnetic contact is in effect in the cavity 20 between the magnet 21 and the electronic monitoring device 9, when the card 15 is unfolded by the patient to take the medicine, the electromagnetic contact in the cavity 20 between the magnet 21 and the electronic monitoring device 9 is broken, such that the electronic monitoring device 9 will record this information capture as being the opening of the packaging for medicines 1 for the medicine to be taken by the patient.

FIG. 4*e* shows the packaging for medicines 1 according to the present invention in the closed position thereof, the card 15 is in the folded state, the magnet 21 is housed in the cavity 20 of the electronic monitoring device 9 and the medicines 3 of the part 23 are housed in the recess between two medicines 3 of the part 24. Such that, when the packaging 1 for medicines is in the closed position, the card 15 is in a first position entirely received in the container 2 and, when the packaging for medicines 1 is in the at least partially open position, the card 15 may be at least partially withdrawn from the container 2 in order to open the part 23 of the card 15 in order to actuate the electronic monitoring device 9 for the information about the intake of medicine 3 by the patient.

FIG. 10 shows the embodiment of the packaging for medicines 1 of FIG. 5 in the assembled state, comprising the base 4 and the guide rails 6 in which the electronic monitoring device 9 is in the inserted state, the blister pack 27 of medicines 3 and the magnet 21 according to the present invention. The electronic monitoring device 9 further comprises a cavity 20 arranged for housing the magnet 21 and a display device 22, preferably an LCD screen.

FIGS. 5, 6, 7, 8*a-c*, 9*a-e* further illustrate a method for manufacturing a packaging for medicines 1 according to the present invention. The manufacturing method comprises providing a container 2 arranged to receive one or more medicines 3, placing a base 4 which comprises an upper face 5 from which two guide rails 6 extend on the container 2 and placing an electronic monitoring device 9 in the guide rails 6 of the base 4.

According to a preferred embodiment of the method for manufacturing a packaging for medicines 1 according to the present invention, the method further comprises an additional step of providing a card 15 in the container 2, the card 15 may comprise and give access to medicines and preferably comprises markers for positioning the base 16 and/or the magnet.

According to another preferred embodiment of the method for manufacturing a packaging for medicines 1 according to the present invention, the method further comprises placing the base 4 on the markers for positioning the base 16.

According to another preferred embodiment of the method for manufacturing a packaging for medicines 1 according to the present invention, the method further comprises positioning a magnet 21 on a part 23 of the card 15 intended to be folded.

Additionally, the packaging for medicines 1 is used for measuring the compliance of a patient with a prescribed dose.

Of course, the present invention is in no way limited to the embodiments described above and many modifications can be made thereto without departing from the scope of the appended claims.

The invention claimed is:

1. A packaging for medicines, comprising:

a container arranged to receive one or more medicine, a base arranged to be attached definitively or temporarily to said container, said base comprising an upper face from which two guide rails extend, each comprising a first part and a second part, said first part of the first rail being parallel to said first part of the second rail, and each extending in a longitudinal direction parallel to the upper surface of the base, an electronic monitoring device for generating data indicative of the intake of said one or more medicine(s) based on event capturing, wherein each rail is a profiled element provided with a first wall extending perpendicularly to said upper surface of the base, along same, and a second wall extending substantially perpendicularly to said first wall and parallel to said upper surface of the base, wherein said electronic monitoring device comprising two lateral insertion grooves with a shape reciprocal to that of said two rails arranged to be housed in said lateral grooves by sliding, which grooves comprise at least one notch, wherein said second part of said guide rails is curved and comprises at least one lateral protrusion, and wherein said at least one notch of said lateral grooves of said electronic monitoring device and said at least one lateral protrusion of said second part of said guide rails are able to cooperate by forced interlocking.

2. The packaging for medicines according to claim 1, wherein said container may comprise a card received in said container, preferably slidingly received, to give access to the medicines of said card, said base being positioned in a fixed or temporary manner on said card.

3. The packaging for medicines according to claim 2, wherein said card comprises markers for positioning said base.

4. The packaging for medicines according to claim 2, wherein said card is formed of two material sections, the first section being arranged to be in contact with a bottom of said container and the second material section is arranged to face the user, said second material section being pierced with a series of orifices, a first orifice of which is provided for housing said guide rails, said base being located between said two material sections forming said card and having, at least in one direction, a width greater than that of said first orifice in order to form a collar which secures said base between said two material sections of said card.

5. The packaging for medicines according to claim 4, further comprising at least one blister pack for medicines being positioned between said two material sections and said medicines being removed via said series of orifices.

6. The packaging for medicines according to claim 2, wherein said card can be moved between a first position and a second position such that, in said first position, said card is entirely received in said outer container, and, in said second position, said card is at least partially slid out of said container so as to generate an event arranged to be captured by a sensor of said electronic monitoring device.

7. The packaging for medicines according to claim 6, wherein said sensor is a passive mechanical sensor, for example a physical, electronic, electromagnetic, light or chemical push button, preferably a low power consumption sensor.

8. The packaging for medicines according to claim 1, wherein said at least one lateral groove of said electronic monitoring device comprises at least one stop element arranged to compel the introduction of said electronic monitoring device in a first sliding direction and to prevent the introduction of said electronic monitoring device in a second sliding direction, opposite to said first sliding direction.

9. The packaging for medicines (1) according to claim 8, wherein said notch (13) is positioned at a first end of said at least one lateral groove (12) of said electronic monitoring device (9), and said at least one stop element (19) is positioned at a second end of said at least one lateral groove (12) of said electronic monitoring device (9) opposite to said first end.

10. The packaging for medicines according to claim 1, wherein said electronic monitoring device further comprises a cavity on the upper face, said cavity preferably comprises walls describing a truncated volume.

11. The packaging for medicines according to claim 10, wherein said cavity is off-center on said upper face.

12. The packaging for medicines according to claim 1, wherein said card has a first part which can be folded down onto a second part, which comprises said series of orifices, said first part further comprising a magnet, preferably of asymmetrical shape, preferentially having a different length and width, intended to be housed in said cavity of said electronic monitoring device, said magnet and said cavity being of complementary shape.

13. The packaging for medicines according to claim 1, wherein said electronic monitoring device further comprises a power source, a processor and optionally a display device, preferably an LCD screen, said processor being arranged to process the captured events and transmit a signal comprising said data indicative of the intake of said one or more medicine(s), said indicative data being optionally displayed on said display device.

14. The packaging for medicines according to claim 1, wherein said electronic monitoring device comprises a memory arranged to record the date and time of said captured event.

15. The packaging for medicines according to claim 1, wherein said container possibly being a medicine box, a pill dispenser, a weekly pill organizer.

16. The packaging for medicines according to claim 1, further comprising a system for blocking the opening of said container, arranged to prevent opening by a child.

17. The method for manufacturing a packaging for medicines according to claim 1, comprising the steps of:

providing a container arranged to receive one or more medicines, placing a base on said container, said base comprising a lower face arranged to be in contact with said container and an upper face from which two guide rails extend, which are arranged to house an electronic monitoring device between said two guide rails, said electronic monitoring device being arranged to generate data indicative of the intake of said one or more medicines based on event capturing.

18. The method for manufacturing a packaging for medicines according to claim 17, wherein said container is formed from a container side by folding thereof.

19. The method for manufacturing a packaging for medicines according to claim 18, further comprising providing a card side comprising a first section and a second section pierced with a series of orifices, a first orifice of which is provided for housing said guide rails, said method comprising folding down said second section onto said first section, each section being positioned on either side of said base, the guide rails protruding through said first orifice and simultaneously placing a blister pack provided with a series of medicines housed in film-covered cavities of said blister pack, each medicine of said series of medicines of said blister pack being arranged facing an orifice of said series of orifices of the card side in order to form a substantially planar card with said first section and said second section positioned on either side of said blister pack and of said base.

20. The method for manufacturing a packaging for medicines according to claim 19, wherein said first section and said second section comprise three parts juxtaposed lengthwise, a bottom part, a back part and a top part, each separated from one another by a fold line; said bottom part of said second section comprising said series of orifices, said method further comprising a step of folding along said fold lines, and a step of folding down said top part of said first and of said second section above said bottom part of said first and of said second section.

21. The method for manufacturing a packaging for medicine according to claim 19, wherein said base is positioned on markers of said bottom part of said first section of said card side.

22. The method for manufacturing a packaging for medicines according to claim 21, wherein said method further comprises a step of placing a magnet on said top part of said second section of the card side, said magnet being arranged to be housed in a cavity of said electronic monitoring device when it is inserted between said guide rails and thus generate an event upon each contacting and/or separation between said magnet and said cavity; preferably on markers for positioning the magnet on said top part of said second section of said card side.

23. The use of a packaging for medicines according to claim 1 for measuring the compliance of a patient with a prescribed dose.

* * * * *